July 31, 1956     R. L. PETTIBONE     2,756,492
MANUFACTURE OF COMPOSITE DUCTILE WIRE
Filed Sept. 13, 1952
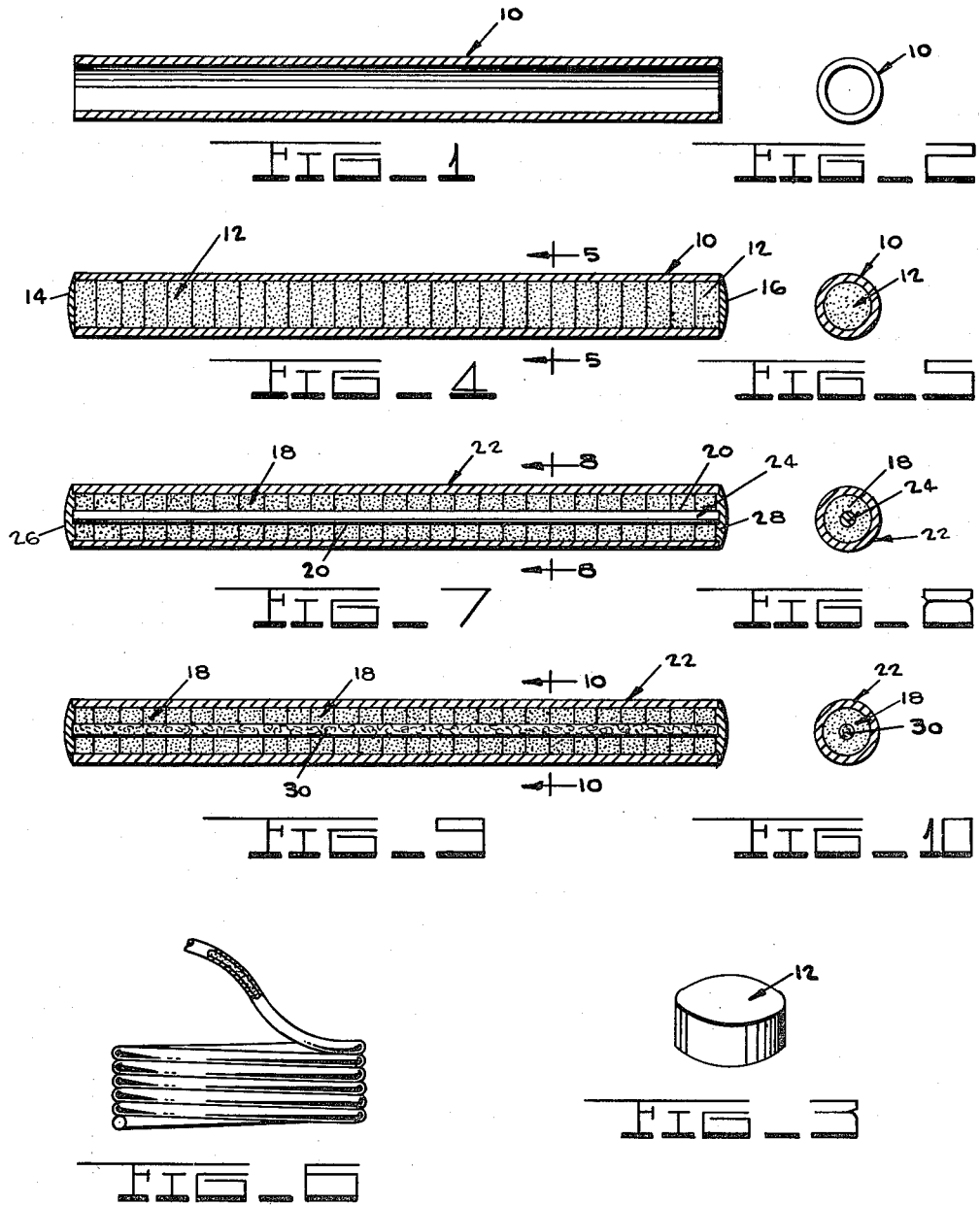
INVENTOR.
ROBERT L. PETTIBONE
BY
ATTORNEYS United States Patent Office 2,756,492
Patented July 31, 1956

2,756,492

MANUFACTURE OF COMPOSITE DUCTILE WIRE

Robert L. Pettibone, Detroit, Mich., assignor to Eaton Manufacturing Company, Cleveland, Ohio, a corporation of Ohio Application September 13, 1952, Serial No. 309,465

3 Claims. (Cl. 29—420.5)

This invention relates to hard facing of engine valves and the like and more particularly to the manufacture of composite ductile wire for hard facing application.

Broadly the invention comprehends the manufacture of composite ductile wire of the type disclosed and claimed in co-pending application Serial No. 299,041 for use in the application of hard facings to engine valves and the like upon the alloying of the various component metallic elements and for alloys of which the wire is composed. Basically the manufacture of this wire involves the utilization of a tube of known metallic or alloy composition, the production of powder or granular compacts of known metallic or alloy make up, the assembling of the compacts within the tube and the subsequent hot working or hot and/or cold working of said filled tube to desired wire size. As such the wire is then ready for the manual or automatic welding thereof for use as hard facing on articles.

Among the objects of the invention are the provision of a method for the manufacture of composite ductile wire for nonductile hard facing application, that:

1. Insures a uniform proportion of metallic compositions throughout the length of the wire produced;
2. Provides for ease and economy in the production of said wire;
3. Provides for ease in the basic assembly of the component elements of said wire;
4. Involves steps in the production of said wire that can be carried out with precision as to predetermined proportioning of the metals and/or alloys making up the wire;
5. Permits of the selection of a wide variety of metals as constituent parts of a final desired alloy analysis whereby in powder or granular form they can be compacted to desired size and shape for ease in the insertion thereof into a tube of known metallic or alloy composition effective to provide for the production of a ductile wire which becomes nonductile after the applicational use thereof; and
6. Provides for a feasible and economical means for the application of hard facing alloy to engine valves and the like.

Other objects and advantages of the invention will appear from the following description taken in connection with the drawings forming a part of the specification, and in which:

Fig. 1 is a cross-sectional view of a metallic tube;

Fig. 2 is an end view of Fig. 1;

Fig. 3 is a perspective view of a compacted powder or granular slug or billet;

Fig. 4 is a cross-sectional assembly view of the tube of Fig. 1 and slugs of Fig. 3;

Fig. 5 is a cross-sectional view taken substantially along lines 5—5 of Fig. 4;

Fig. 6 is a partly fragmentary partly cross-sectional view of a wire produced from the assembly of Fig. 4;

Fig. 7 is a cross-sectional view of a modified assembly from that of Fig. 3;

Fig. 8 is a cross-sectional view taken substantially along lines 8—8 of Fig. 7;

Fig. 9 is a further modified assembly from that of Figs. 4 and 7; and

Fig. 10 is a cross-sectional view taken substantially along lines 10—10 of Fig. 9.

The method of manufacture of composite ductile wire, of the type defined in application Serial No. 299,041, as here advocated, is directed at the efficient and economical production thereof whereby a wire is produced that is unquestionably suitable for application as a nonductile hard facing to engine valves and the like. It was determined as a necessity in the manufacture of a ductile wire which would upon application produce a nonductile facing that metallic powders or granules would have to be employed each in their free state since a prealloying thereof together into solid form would destroy the ductility thereof. Further, it was determined that a ductile tube or sheath, having properties which when alloyed with the powders or granules, would produce the final desired alloy facing, would be required as means for enclosing and holding the powder or granules in the production of a ductile wire with the powder or granules as a core therefor. Since the filling of the tube or sheath offered problems as to the determination of properly proportioning the metallic properties of the tube and the powder or granular fill therefor, eliminating voids in the pouring of the powder or granules into the tube, obtaining a desired and uniform density of fill per unit of length of the tube and eliminating collapsing of the tube in the displacement of the fill in the tube in the working thereof to wire size, it was found advisable and most practical to form the metal powder or granules into pre-pressed compacts of known proportionate constituency and predetermined density. As such said compacts made of a cylindrical shape and size slightly less in diameter than the inner diameter of the tube can be easily inserted in stacked or nested relation within the tube whereby per unit length of the tube and a predetermined metallurgical analysis can be obtained. With the tube filled it is then only necessary to cap the ends thereof and work the composite structure to desired wire size.

Deviations from the use of solid cylindrical compacts may consist in the provision of central axial bores through the compacts, into which after the assembly thereof in the tube may be inserted a solid ductile wire of metal or alloy composition or scrap-alloy turnings or chips whereupon a like working of the tube and contents will produce the desired final wire product.

Referring to the drawings for more specific details of the invention 10 represents generally a tube or sheath and 12 represents a powder or granule compacted slug adapted for insertion in the tube 10.

The tube 10 which is to be ductile and hot and/or cold workable can be composed of any of several different metals or alloys such as nickel, or nickel alloy, cobalt or cobalt alloy, iron or stainless steel whereas the slugs 12 are to be made of mixtures of metallic powders or granules which together with the tube will provide a desirable hard facing alloy when applied by welding or the like to a base metal. These slugs 12 which are each to be made of the same mixture for application in tube 10 can include, as constituent metals thereof, chromium, tungsten, cobalt, carbon, aluminum, boron, silicon and manganese or many others depending on the end properties and characteristics of the hard facing nonductile alloy desired. Slugs 12 are each, as shown by Fig. 3, made cylindrical in form by well known pressing methods employed in powder metallurgy to a desired density, and as shown by Fig. 4, through the making thereof of a diameter slightly smaller than the inner diameter of tube 10, they can be inserted in stacked relation in tube 10 with their axes coinciding substantially with the axis of the tube and with the outer periphery of the slugs serving the purpose of a support on the inner wall surface of the tube.

End retainer caps or plugs 14 and 16 are brazed or otherwise fixedly secured on the opposite ends of the tube 10 effective to retain the slugs in assembly with the tube. Either cap 14 or 16 may be secured to the tube 10 prior to the insertion of the slugs therein or they may both be secured to the tube after the tube is filled with the slugs.

With the slugs 12 having an outer cylindrical surface which mates with the inner surface to the tube 10, a resistance is offered by said outer surface of the slugs in the swaging of the tube to desired wire size effective to prevent collapse of the tube at any point along the length of the tube and thereby permit of the maintaining of uniformity of the tube as to the predetermined established proportions of metallic composition between the tube and slugs.

The working of the tube 10 and slugs 12 assembly of Fig. 4 can be effected through the progressive rolling thereof to a predetermined reduced size and subsequently the drawing thereof to finished size ready for application use whereupon the opposite ends of certain length have to be removed to thus insure a wire of desired analysis.

The following illustrates an example of a typical analysis determination to be used in the production of composite ductile wire for non-ductile application.

ANALYSIS DETERMINATION

*Powder mix calculations in relation to material content of tube*

Nickel-chromium tube analysis: 80% nickel+20% chromium

| Tube (Nichrome)— | | Percent |
|---|---|---|
| Nickel 80% | 115.36 grams | 41.6 |
| Chromium 20% | 28.84 grams | 10.4 |
| Slugs (powder compacts)— | | |
| Nickel | 30.84 grams | 11 |
| Chromium | 54.37 grams | 19.5 |
| Tungsten | 41.30 grams | 15 |
| Carbon | 6.94 grams | 2.5 |
| Material analysis by percentage— | | |
| Nickel | | 52.5 |
| Chromium | | 30 |
| Tungsten | | 15 |
| Carbon | | 2.5 |

This analysis falls within the range of Eatonite as presently employed in the hard facing of engine valves.

Fig. 7 illustrates a modification in assembly and method for the production of a composite ductile wire wherein by way of example cylindrical slugs 18 having a central bore 20 therethrough are provided.

A tube 22 similar to tube 10 in all respects of composition ad the like is provided into which the slugs 18 are to be inserted in stacked relation whereby by the outer peripheries thereof engage the inner wall surface of the tube 22 to lend support thereto. For example as compared to the assembly of Fig. 4 slugs 18 can be made of a powdered mixture of carbon and nickel and a ductile wire 24 of tungsten is inserted centrally into the bores 20 of the slugs. As such a like analysis can be obtained as that given for example to the assembly of Fig. 4 with the added advantage that the dutile tungsten wire lends body to the assembly in the working thereof to final wire size. Likewise as the structure of Fig. 3, caps 26 and 28 comparable to caps 14 and 16 are employed in a like manner thereto for a like purpose. Although tungsten is defined as one specific form of ductile wire to provide for a specific analysis whereupon the end product ductile wire becomes non-ductile upon welding use thereof it is conceivable that other ductile wire can likewise be employed. Molybdenum for example can also be used where the desired analysis requires molybdenum as a constituent thereof. In connection with the utilization of a core wire 24 it is preferable to use a metal which does not form a part of the tube so as not to require the use of too thin a tube which might not be able to withstand working operations used to produce a composite wire of desired size.

After the assembly of Fig. 7 is reduced to desired wire size the identity of the elements tube 18, slugs 22, wire 24 and caps 26 and 28 is retained insofar as their metallic makeup, whereby the tubes, slugs, wire and caps are proportionately reduced in size. With the production of the composite wire certain lengths at opposite ends thereof constituting the swaged caps 26 and 28 have to be removed whereby the remaining wire of desired analysis is ready for use.

Fig. 9 illustrates a further modification in the production of a composite ductile wire wherein cylindrical slugs 18 as amended in tube 22 are adapted to receive in the co-axial bores thereof scrap alloy turnings or chips 30. These chips or turnings can be of any desired alloy composition just so that the content thereof together with the tube and slugs will provide the necessary and desired final analysis for non-ductile weld facings. A source of these chips or turnings is from the material removed from non-ductile hard faced articles in the machinery thereof to final size and as such provides a novel and economic manner of reclaiming and reusing what might otherwise be a costly loss.

A hot or cold working of the structure of Fig. 6 can be carried out in identical respects of the structures of Figs. 3 and 5 in the finalizing of the wire to desired size.

Although this invention has been defined in specific terms as to a particular metallurgical analysis and steps in the working of the basic elements thereof as assembled to final wire size the invention is not to be limited to the extent thereof since the basic concept of invention is in the method of fabrication of a composite ductile wire wherein pre-pressed powder compacts are assembled in a ductile and workable tube whereby a desired metallurgical analysis wire is obtained, effective to produce a non-ductile hard facing in the application of the wire. Accordingly, the invention is to be construed in the light thereof as recited by the appended claims.

What I claim is:

1. The method of making composite ductile wire for welding use to produce a hard facing comprising the provision of a ductile workable seamless tube of predetermined size, wall thickness and metallic composition, pre-compacting a plurality of substantially equal diameter and equal length cylindrical slugs of a powder or granule metallic composition, of an analysis which when alloyed with the tube to form a non-ductile body, fixedly securing a plug upon one end of the tube to seal off said end, inserting the slugs one upon another in the tube, with their cylindrical surfaces substantially in engagement with the internal periphery of the tube, to the full capacity of the tube, fixedly securing a plug upon the remaining open end of the tube to seal off said latter end of the tube, and then working and reducing the diameter of the assembly of tube, slug and ends to final desired wire size.

2. The method according to claim 1 wherein the tube is about 15% chromium, about 5% iron and the balance nickel and the pressed cylindrical slugs of metallic particies and of substantially identical size and density have an analysis of about 23.8% nickel, 40.5% chromium, 5.1% carbon and 30.6% tungsten.

3. The method of making composite ductile wire for welding use to produce a hard facing comprising the provision of a ductile metallic composition tube, pressing a plurality of powder or granule cylindrical slugs, having central bores therethrough, of like metallic composition and density, inserting the slugs in the tube in end to end engaging relation with their axes coinciding with the axis of the tube, inserting a wire into the coaxial bores of the slugs, said slugs and wire being of an analysis which when alloyed with the tube to form a non-ductile body, wherein the tube is of nickel, chromium and iron composition, the slugs are of nickel, chromium and carbon composition and the wire is of tungsten and wherein the slugs fill the tube, the wire is of a length substantially equal to the axial combined length of the slugs, caps are secured upon opposite ends of the tube to retain the slugs and wire in assembly therein and the assembly of tube, slugs and wire are worked to desired ductile composite wire size.

References Cited in the file of this patent

UNITED STATES PATENTS

| | | |
|---|---|---|
| 1,704,978 | Knott | Mar. 12, 1929 |
| 1,989,186 | DeBats | Jan. 29, 1935 |
| 2,061,350 | Coupier et al. | Nov. 17, 1936 |
| 2,241,441 | Bandur | May 13, 1941 |
| 2,334,609 | Cox | Nov. 16, 1943 |
| 2,401,483 | Hensel | June 4, 1946 |
| 2,493,143 | Ingels | Jan. 3, 1950 |

OTHER REFERENCES

Ser. No. 377,905, Cito (A. P. C.), published May 25, 1943.